（12） United States Patent
Donegan

(10) Patent No.: US 8,777,453 B2
(45) Date of Patent: Jul. 15, 2014

(54) LED REPLACEMENT KIT FOR HIGH INTENSITY DISCHARGE LIGHT FIXTURES

(76) Inventor: Daniel Donegan, Boise, ID (US)

(*) Notice: Subject to any disclaimer, the term of this patent is extended or adjusted under 35 U.S.C. 154(b) by 298 days.

(21) Appl. No.: 13/024,872

(22) Filed: Feb. 10, 2011

(65) Prior Publication Data

US 2011/0249441 A1    Oct. 13, 2011

Related U.S. Application Data

(60) Provisional application No. 61/303,130, filed on Feb. 10, 2010.

(51) Int. Cl.
*F21V 21/00* (2006.01)
(52) U.S. Cl.
USPC ........... 362/249.05; 362/8; 362/276; 362/294
(58) Field of Classification Search
USPC .............. 362/249.02, 249.05, 253, 276, 294, 362/373, 458, 646, 650, 3, 4, 5, 8
See application file for complete search history.

(56) References Cited

U.S. PATENT DOCUMENTS

| | | | |
|---|---|---|---|
| 6,911,915 B2 | 6/2005 | Wu et al. | |
| 7,347,706 B1 | 3/2008 | Wu et al. | |
| 7,520,635 B2 * | 4/2009 | Wolf et al. | 362/276 |
| 8,100,552 B2 * | 1/2012 | Spero | 362/249.02 |
| 8,390,207 B2 * | 3/2013 | Dowling et al. | 315/186 |
| 2004/0195947 A1 | 10/2004 | Clark et al. | |
| 2008/0002399 A1 | 1/2008 | Villard et al. | |

* cited by examiner

*Primary Examiner* — Stephen F Husar
(74) *Attorney, Agent, or Firm* — Robert L. Shaver; Dykas & Shaver, LLP

(57) ABSTRACT

Disclosed is a kit for converting an existing high discharge light unit to an LED based light unit, with the option of including a networked capability among a group of LED light units. The kit includes a drop-in component mounting plate on which are mounted an LED light source, sensors including a thermal sensor, a control unit, a DC power supply, a heat sink, and a dimmer unit. A wireless transceiver allows the LED light units to operate as a network, with two way flow of information from the LED light units to a control unit.

19 Claims, 5 Drawing Sheets

LED REPLACEMENT KIT FOR HIGH INTENSITY DISCHARGE LIGHT FIXTURES

PRIORITY/CROSS-REFERENCE TO RELATED APPLICATIONS

This application claims the benefit of U.S. Provisional Application No. 61/303,130, filed Feb. 10, 2010, the disclosure of which is incorporated by reference.

TECHNICAL FIELD

The presently disclosed and claimed inventive concept generally relate to an apparatus and method for retrofitting high intensity discharge lights with LED lighting units, and more particularly to a kit for accomplishing this.

There is a huge installed base of high intensity discharge lights in places such as parking lots, outside building illumination, warehouse indoor lighting, freeways and streetlights. The typical technology in these light units are mercury vapor, metal halide, high pressure sodium, fluorescent, or others. These lights require large amounts of electricity, and are not as efficient as newer LED technology. What is needed is an LED light assembly equivalent to the intensity discharge lamps in light output, but which benefits from the improved efficiency of LED technology.

SUMMARY OF THE DISCLOSURE

The installed base of high intensity discharge (HID) light fixtures are used in many situations where a large area must be lighted. This includes, but is not limited to, parking lots, parking garages, street and sidewalk lights, warehouses, and other large buildings. The installed base of high intensity discharge fixtures may include mercury vapor, metal halide, high pressure sodium, fluorescent or other types The disclosed technology is a kit for retrofitting an existing fixture incorporating a high intensity discharge light bulb so that it operates with one or more LED light sources. The LED kit may include a driver, by which input power is transformed and conditioned to supply power to the LED light sources. The kit also includes one or more LED light sources, with the LED light sources providing 600 lumens or more of light. A typical kit may reduce a HID light fixture's consumption of electrical power by more than 50%. The LED light sources may be set at an angle so that they may be aimed at a selected position. Lenses may be placed over the LED light sources so that the light from the LEDs is evenly dispersed over an area. These lenses can be customized to suit the light dispersion or concentration requirements of a particular location.

The retrofit kit may also include a dimmer which can be computer or sensor controlled. The computer controlled dimmer may be controllable by a wireless network from a consol at a security station or a handheld device, from which the LED light source's light may be briefly intensified beyond the normal operating limits in order to better view an area for security purposes. The dimmer may also be attached to sensors. Sensor inputs to the dimmer may be used to reduce or increase the light from the LED light sources. A sensor may detect motion, and could turn the LED light source's light on or intensify the light whenever motion is detected. A different sensor may be utilized to detect whether it is daylight or nighttime outside, with the LED light sources light dimmed during the daytime and intensified at nighttime. Another sensor may detect sound, with the LED light sources light turned to a higher output when sound is detected that exceeds a minimum threshold.

A thermal managing system is present so that heat generated from the LED light sources does not result in a thermal overload of the LED light sources. As the thermal maximum threshold of the LED light sources is approached, the LED light sources would be dimmed so that the maximum thermal operating temperature is not exceeded.

A wireless bidirectional communication network capability may be present in each kit that allows control and monitoring of the LED light unit from a computer or handheld device. Each LED light unit is thus a node in the network where multiple LED light units comprise a plurality of nodes interconnected to one another by bidirectional communication links. The bidirectional communication network may include a plurality of communication loops (horizontal and vertical loops) each comprising a plurality of nodes interconnected to one another by wireless bidirectional communication links. Each horizontal communication loop is connected to each vertical communication loop at a node which is common to both the horizontal communication loop and the vertical communication loop. This common node (and, in fact, each LED light unit in the network) includes the capability to transfer data packets from the horizontal communication loop to the vertical communication loop, and vice versa, as a function of destination addresses contained in the packets.

DETAILED DESCRIPTION OF THE EXEMPLARY EMBODIMENTS

Figure 1:
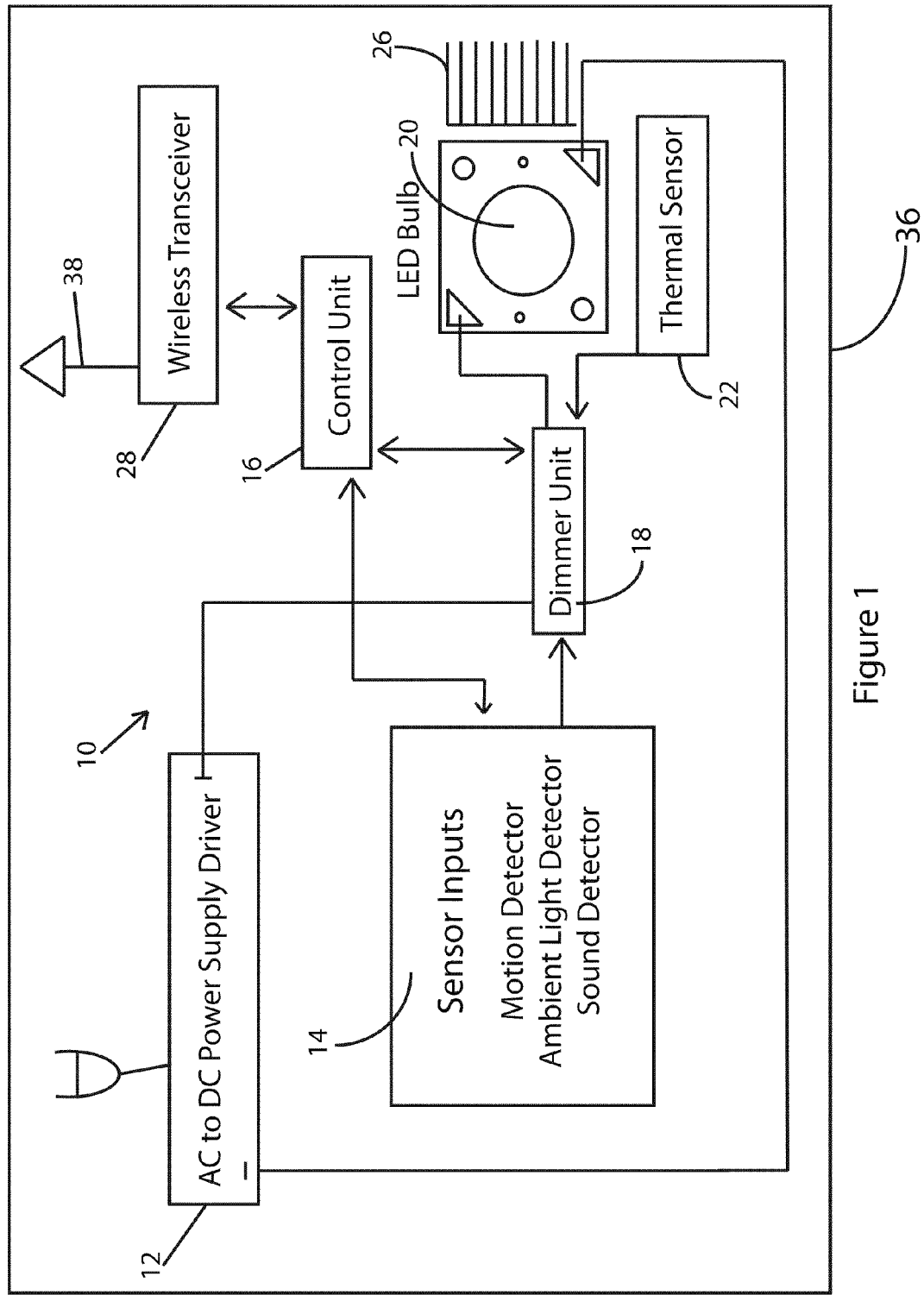
FIG. 1 is a diagram showing the connections of the parts of the LED lighting unit.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates an embodiment of the inventive concepts, which make up the kit 10, configured for conversion of high intensity discharge light units to LED operation. The kit 120 includes an AD to DC power supply 12 which is connected to line voltage at 24. The DC power is routed through a dimmer unit 18, which is controlled by a control unit 16. Sensor inputs 14 are provide information to control unit 16, which in turns sends control signals to dimmer unit 18. The thermal sensor 22 also sends input to the dimmer unit 18, for varying the output of the LED light source 20. A heat sink 26 is also present. LED light unit refers to the entire light in the light fixture, and LED light source refers to the light producing LEDs that emit light. The LED light sources are made of multiple LEDs.

Each of these components can be varied according to a particular installation, but a typical installation is to replace an acorn type metal halide high intensity discharge lamp. The acorn type light includes a light fixture, a socket, ballast, and a light bulb, where are removed or at least disconnected in the case of the ballast, in order to install the kit. The fixture and the globe are retained in the retrofitted light unit. The components of the kit are installed on a mounting platform 36, and are installed as a unit in the light fixture. The mounting platform 36 is configured to fit in the ballast of the original light and to be thermally connected to the fixture for heat dissipation. For an installation in an acorn type light fixture made for use with a 175 W bulb, the parts of the kit are installed on the mounting plate 36 and that mounting plate 36 is installed in the fixture. Components include an AC to DC power supply driver 12 which converts the 277 v AC to 24 v DC. A constant current driver may be used, such as a model LED-INTA_711C-140-F30, made by Philips.

A suitable dimmer unit 18 is exemplified by a model DD032450, made by Simply LEDs. This dimmer unit is capable of reducing the DC current from 1050 ma to 300 ma, which modulates the intensity of light emitted by the LED light source 20. Different dimmer parameters would also be suitable, depending on the particular installation.

A thermal sensor 22 is present to detect the buildup of heat from the LED light source 20. Excess heat from the LED decreases the lifespan of the LED light source 20. The thermal sensor 22 is thus a protection device for the LED light source 20. When heat exceeding a certain threshold is sensed, the energy going to the LED light source 20 is reduced by the signal from the thermal sensor 22 to the dimmer unit 18. A suitable thermal sensor is a model QT1206-104F, made by Quality Thermistor, but a number of other thermal sensors would be suitable.

Sensor inputs 14 can be a number of different sensors, such as motion detectors, ambient light detectors, sound detectors, power sensors, light output sensors, and others. These could operate through the control unit 16 and or through the wireless transceiver 28 as a network of nodes. When acting as non-networked LED light units, designated 30 in the figures, the motion detector could cause an LED light unit 30 to turn on, or to increase the light intensity. The default light intensity could be controlled by the ambient light detector, so that LED light units 30 are turned off during the day time.

A number of LED light sources are workable in this device, and an exemplary one is a 13 w LED light source containing 12 individual LEDs, made by Bridgelux, model number BXRA-N9802.

Figure 2:
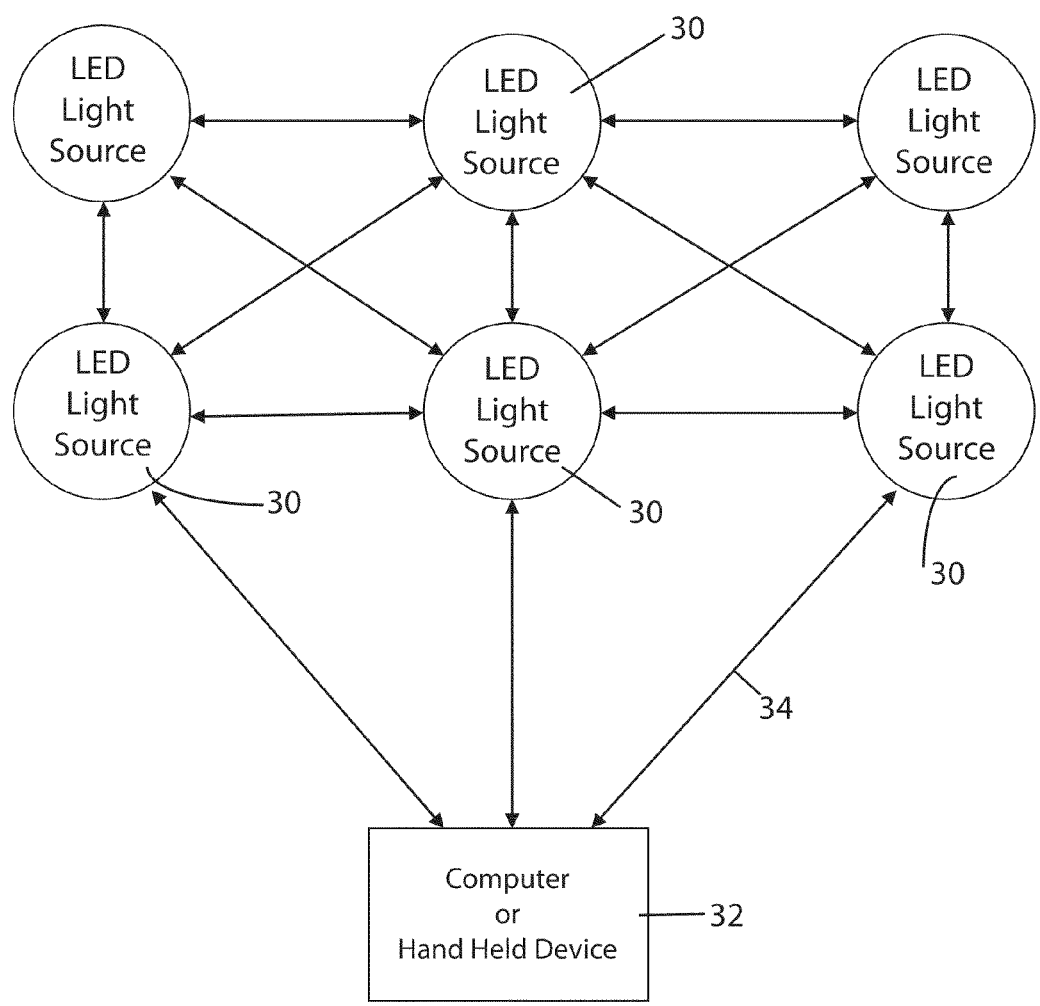
FIG. 2 is a diagram showing two directional wireless communication between nodes of the network of LED light units.

FIG. 2 shows the LED light units linked together as a network with each LED light unit being a node in the network. When the LED light units 30 with the kit installed are equipped with a wireless transceiver 28, they may be linked together to form a network, with the capability of interacting with nearby LED light units 30. This mode has the advantage of requiring less signal range from a central control unit, because a control signal can be sent from one LED light unit 30 to another, and passed along to other LED light units 30. This mode of control is shown in FIG. 2, in which a computer or hand held device serves as a central control unit 32. A control signal 34 can be sent from the control unit 32, or can be initiated by any one of the LED light sources 30.

For instance, a motion sensor in one LED light unit 30 can cause adjacent LED light units to activate, or could form a lighted route to an entry point, and activate the entry point lights. The same signal could be sent to the control unit 32, and the motion activation would be recorded for later review.

Status monitors on the LED light units 30 could send information about LED light status, power draw, light output, or other status information to the control unit 32, by sending a data signal from one LED light unit 30 to another, and eventually to the control unit 32.

Some of the LED light units could include a video camera, or could be linked via the network to building mounted video cameras. Thus when motion is sensed by an LED light unit, as one example, a nearby LED light unit with a video camera or a building mounted video camera could be activated.

Figure 3:
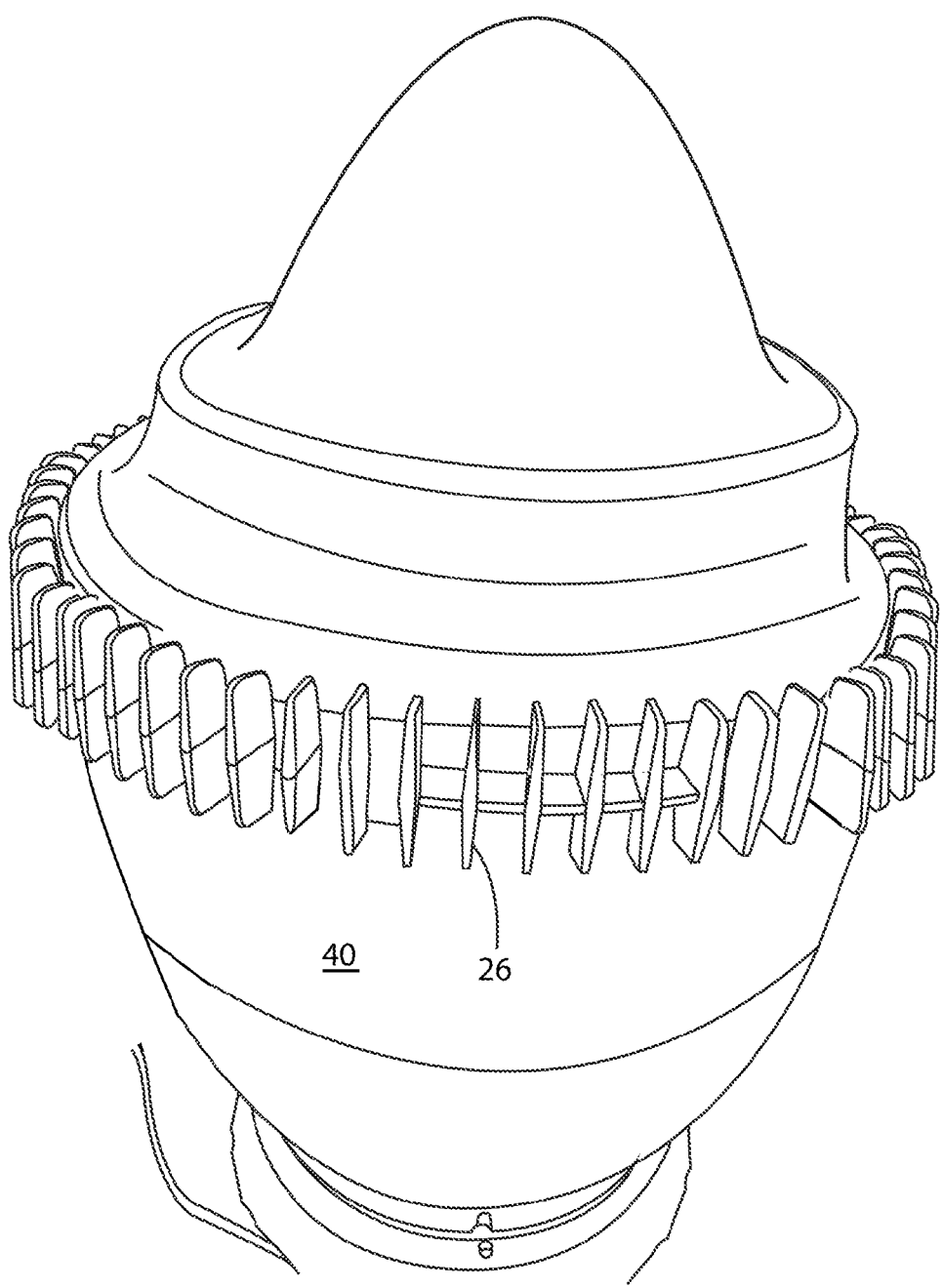
FIG. 3 shows a type of light fixture called an acorn fixture.
Figure 4:
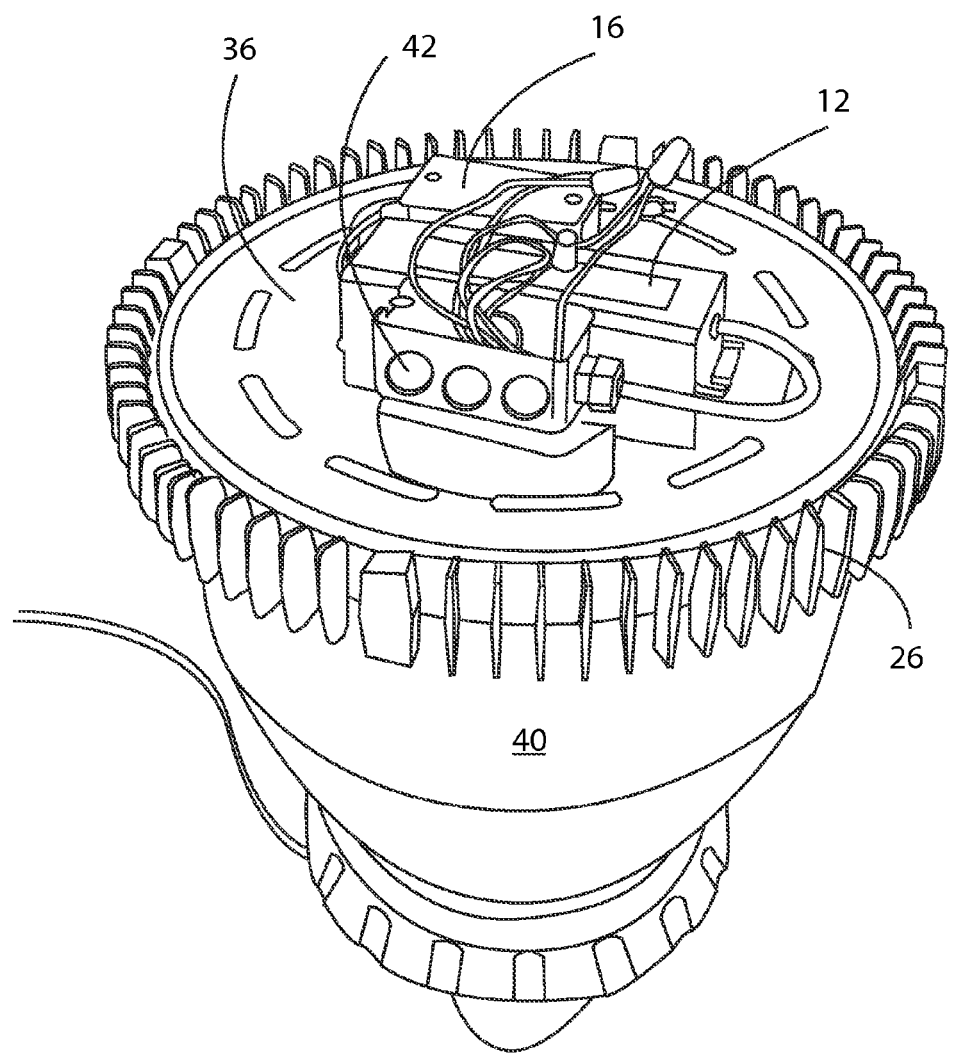
FIG. 4 shows an acorn fixture with the top removed.
Figure 5:
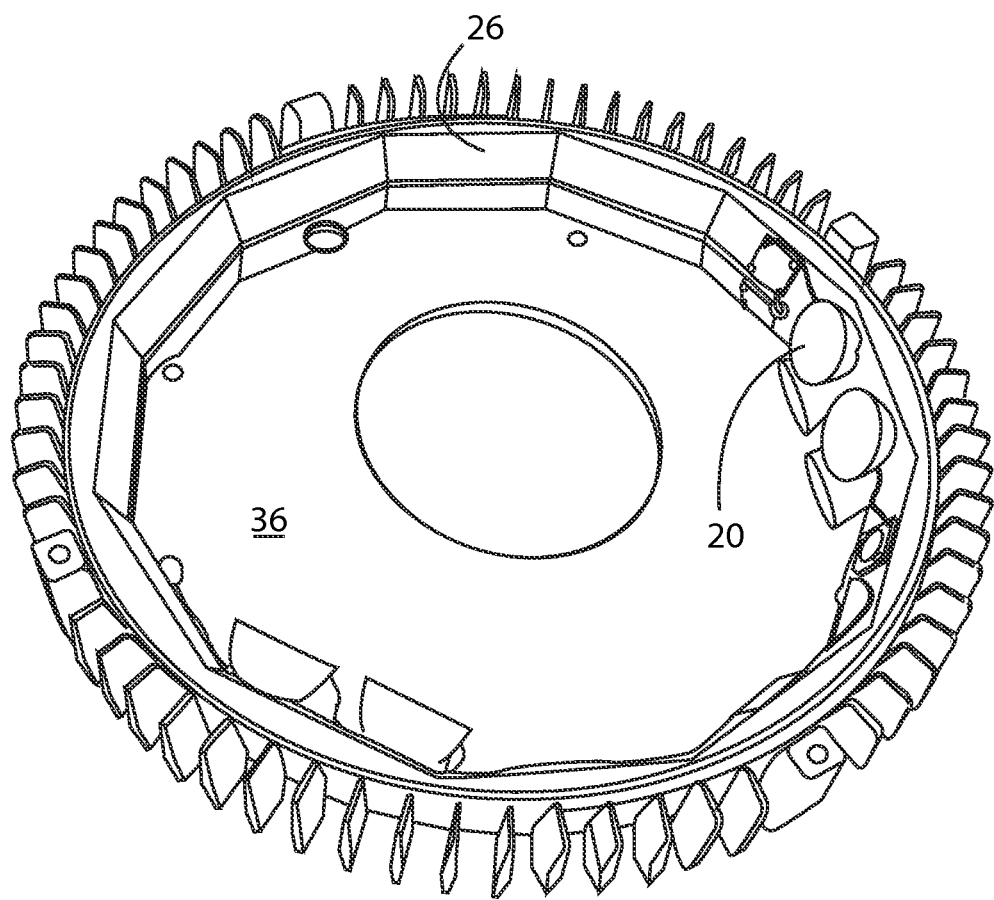
FIG. 5 shows the heat sink and mounting plate of a kit for an acorn fixture.

FIG. 3 shows a type of fixture called an acorn fixture, with a heat sink 26 and a globe 40 shown. FIG. 4 shows an acorn fixture with the top removed, with the power cord, the power supply 12, the control unit 16, the heat sink, the mounting plate 36 and the video camera 42. FIG. 5 shows the mounting plate 36, the heat sink 26, and LED light sources 20.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A kit for retrofitting an existing high intensity discharge lamp in a fixture for conversion to an LED light output unit, comprising:
    a mounting plate with heat sink characteristics and configure for thermal contact with said fixture, said mounting plate serving as a platform for placement of kit components, with said mounting plate shaped for engagement and attachment with a selected fixture;
    a driver for supplying power to one or more LED light sources;
    one or more LED light sources;
    a heat sink separate from said mounting plate;
    a dimmer unit, for adjusting the power to said one or more LED replacement;
    a sensor linked to said dimmer unit, to adjust the power to said one or more LED light sources based on a sensed input; and
    a thermal sensor connected to said dimmer unit, for detecting heat overloads and reducing power to said one or more LED light sources to keep said replacement LED light sources within thermal limits;
    with each of said LED light units wirelessly connected to other LED light units in a network via said wireless communication unit, with each LED light unit forming a node in said network, capable of initiating action and transferring data to and/or from other LED light units in the network and to a base computer.

2. The kit for retrofitting an existing high intensity discharge lamp of claim 1, in which said sensor is a motion detector, configured to signal for brighter light when motion is detected and for less light or no light when motion is not detected.

3. The kit for retrofitting an existing high intensity discharge lamp of claim 2, which further includes a video camera connected to said motion sensor, configured for activation by a signal from said motion detector.

4. The kit for retrofitting an existing high intensity discharge lamp of claim 1, in which said sensor is a light detector, configured to signal said dimmer unit for less or no light when daylight is detected, and for brighter light when daylight is not detected.

5. The kit for retrofitting an existing high intensity discharge lamp of claim 1, in which said sensor is a sound detector, configured to signal said dimmer unit for brighter light when sound is detected and for less or no light when sound is not detected.

6. The kit for retrofitting an existing high intensity discharge lamp of claim 1, in which said dimmer unit is controllable remotely from a wireless network control computer or handheld device.

7. The kit for retrofitting an existing high intensity discharge lamp of claim 1, in which said dimmer is configured for a temporary boost in power to said one or more LED light sources, if directed by a wireless network control computer.

8. The kit for retrofitting an existing high intensity discharge lamp of claim 1 in which said kit includes a bidirectional wireless communication function for remote control and monitoring of said one or more LED light units.

9. The kit for retrofitting an existing high intensity discharge lamp of claim 8 in which said LED light unit is connected to other LED light unit in a network via said wireless communication unit, with each LED light unit forming a node in said network, capable of transferring data to and/or from other LED light units in the network.

10. The kit for retrofitting an existing high intensity discharge lamp of claim 9 in which said information passed between LED light units is a light intensity instruction.

11. The kit for retrofitting an existing high intensity discharge lamp of claim 10 in which said information passed between LED light units is status information of light fixture components.

12. The kit for retrofitting an existing high intensity discharge lamp of claim 10 in which said information passed between LED light units is motion sensor information.

13. The kit for retrofitting an existing high intensity discharge lamp of claim 10 in which said information passed between LED light units is heat and lamp identification number information.

14. The kit for retrofitting an existing high intensity discharge lamp of claim 10 in which said information passed between LED light units is video camera data.

15. The kit for retrofitting an existing high intensity discharge lamp of claim 2, in which detected motion results in a plurality of LED light sources being activated by wireless communication between LED light sources without user authorization, with said LED light sources illuminating a path from said detected motion to an entry point.

16. A kit for retrofitting an existing high intensity discharge lamp in a fixture for conversion to an LED light output unit, comprising:
   a mounting plate with heat sink characteristics and configure for thermal contact with said fixture, said mounting plate serving as a platform for placement of kit components, with said mounting plate shaped for engagement and attachment with a selected fixture;
   a driver for supplying power to one or more LED light sources;
   one or more LED light sources;
   a heat sink separate from said mounting plate;
   a dimmer unit, for adjusting the power to said one or more LED replacement;
   a sensor linked to said dimmer unit, to adjust the power to said one or more LED light sources based on a sensed input;
   a bidirectional wireless communication unit for remote control and monitoring of said one or more LED light units by LED light unit to LED light unit communication, in which each of said LED light units is connected to other LED light units in a network via said wireless communication unit, with each LED light unit forming a node in said network, capable of transferring data to and/or from other LED light units in the network; and
   a thermal sensor connected to said dimmer unit, for detecting heat overloads and reducing power to said one or more LED light sources to keep said replacement LED light sources within thermal limits.

17. The kit for retrofitting an existing high intensity discharge lamp of claim 16, which further includes a video camera wirelessly connected to said motion sensor in an LED light source, configured for activation by a signal from said motion detector in an adjacent LED light source, with said video camera providing a video signal for transmission from one LED light source to another LED light source via a short range signal for relay of said signal to a computer, thus providing long range sensing capability and signal relay using short range transmitters.

18. The kit for retrofitting an existing high intensity discharge lamp of claim 17 in which said information passed between LED light units is video camera data.

19. A kit for retrofitting an existing high intensity discharge lamp in a fixture for conversion to an LED light output unit, comprising:
   a mounting plate with heat sink characteristics and configure for thermal contact with said fixture, said mounting plate serving as a platform for placement of kit components, with said mounting plate shaped for engagement and attachment with a selected fixture;
   a driver for supplying power to one or more LED light sources;
   one or more LED light sources;
   a heat sink separate from said mounting plate;
   a dimmer unit, for adjusting the power to said one or more LED replacement;
   a sensor linked to said dimmer unit, to adjust the power to said one or more LED light sources based on a sensed input;
   a motion sensor for detecting nearby motion and sending a signal to said control unit;
   a video camera connected to said motion sensor, configured for activation by a signal from said motion detector;
   a bidirectional wireless communication unit for remote control and monitoring of said one or more LED light units, with said wireless communication unit forming a network of LED lighting units, with each LED light units being a node in the network for transferring data, including video camera data, from with each LED light unit forming a node in said network for relay of video and thermal data from one LED light unit to another and to a computer, with a light unit configured to activate other light units without user intervention to illuminate a route from detected motion to a building entrance; and
   a thermal sensor connected to said dimmer unit, for detecting heat overloads and reducing power to said one or more LED light sources to keep said replacement LED light sources within thermal limits.

* * * * *

UNITED STATES PATENT AND TRADEMARK OFFICE
Certificate

Patent No. 8,777,453 B2　　　　　　　　　　　　　　　　　　　　　　　　Patented: July 15, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Daniel Donegan, Boise, ID (US); and Robert Sumner Deely, Garden City, ID (US).

Signed and Sealed this Twenty-first Day of October 2014.

DIANE LEE
*Supervisory Patent Examiner*
Art Unit 2875
Technology Center 2800